(12) United States Patent
Zhang et al.

(10) Patent No.: US 10,845,243 B1
(45) Date of Patent: Nov. 24, 2020

(54) METHOD FOR ESTABLISHING CONTENT MONITORING MODEL OF CANOPY WATER OF WINTER WHEAT BASED ON SPECTRAL PARAMETERS

(71) Applicant: China Institute of Water Resources and Hydropower Research, Beijing (CN)

(72) Inventors: Baozhong Zhang, Beijing (CN); Zhigong Peng, Beijing (CN); Zheng Wei, Beijing (CN); He Chen, Beijing (CN); Shaozhe Lin, Beijing (CN); Jiabing Cai, Beijing (CN); Lu Liu, Beijing (CN); Nana Han, Beijing (CN); Qian Zhang, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 16/878,620

(22) Filed: May 20, 2020

(30) Foreign Application Priority Data

May 20, 2019 (CN) .......................... 2019 1 0416336

(51) Int. Cl.
*G01J 3/42* (2006.01)
*A01G 22/20* (2018.01)
(Continued)

(52) U.S. Cl.
CPC ................ *G01J 3/42* (2013.01); *A01G 22/20* (2018.02); *G01N 21/359* (2013.01);
(Continued)

(58) Field of Classification Search
CPC ... G01J 3/42; G01N 21/3577; G01N 21/3554; G01N 21/359; A01G 22/20
See application file for complete search history.

(56) References Cited

FOREIGN PATENT DOCUMENTS

CN 101968443 A 2/2011
CN 102426153 A 4/2012
(Continued)

OTHER PUBLICATIONS

Xiaojing Liu et al, Estimating Soil Moisture Distribution in WinterWheat Field Using SOC710VP Hyperspectral Imagery, Journal of Irrigation and Drainage, Mar. 2019, pp. 35-42, No. 3 vol. 38.
(Continued)

*Primary Examiner* — David P Porta
*Assistant Examiner* — Shun Lee
(74) *Attorney, Agent, or Firm* — Bayramoglu Law Offices LLC

(57) ABSTRACT

A method for establishing a monitoring model of a water content of a winter wheat canopy based on spectral parameters, includes the following steps: measuring a spectral reflectance and a water content of the winter wheat canopy; constructing the spectral parameters through the spectral reflectance; wherein, the spectral parameters comprise spectral transformation forms and "trilateral" parameters; performing correlation analysis on the water content of the winter wheat canopy and the spectral transformation forms and the trilateral parameters, selecting comprehensive spectral parameters with a significant correlation for each growth stage, performing principal component analysis on the comprehensive spectral parameters, separately constructing a water content monitoring model for each growth stage, and combining the water content monitoring model for each growth stage into the monitoring model of the water content of the winter wheat canopy for the whole growth stage.

3 Claims, 4 Drawing Sheets

(51) Int. Cl.
*G01N 21/359* (2014.01)
*G01N 21/3577* (2014.01)
*G01N 21/3554* (2014.01)

(52) U.S. Cl.
CPC ..... *G01N 21/3554* (2013.01); *G01N 21/3577* (2013.01); *G01J 2003/425* (2013.01)

(56) References Cited

FOREIGN PATENT DOCUMENTS

| | | |
|---|---|---|
| CN | 102507480 A | 6/2012 |
| CN | 102721651 A | 10/2012 |
| CN | 103472009 A | 12/2013 |
| CN | 108548793 A | 9/2018 |
| CN | 109187441 A | 1/2019 |

OTHER PUBLICATIONS

Yongchao Tian et al, Relationship between canopy reflectance and plant water status of wheat, J. Appl. Ecol., 2004, pp. 2072-2076, 15(11), China.

Habure et al., Estimating Water Content of Winter Wheat Canopy Based on Its Spectral Characteristics, Journal of Irrigation and Drainage, Oct. 2018, pp. 9-15, No. 10 vol. 37.

Yuan-Yuan Wang et al., Retrieval of Leaf Water Content of Winter Wheat from Canopy Hyperspectral Data Using Partial Least Square Regression, 2010, pp. 1070-1074, vol. 30, China.

Lu Liu et al., Monitoring of Summer Corn Canopy SPAD Values Based on Hyperspectrum, Jan. 2019, pp. 353-360, vol. 33.

E. H. Rong, et al., Changes in Winter Wheat Grown Under Irrigated and Rainfed Condition, The Journal of Animal & Plant Sciences, 2013, pp. 1700-1708, 23(6).

METHOD FOR ESTABLISHING CONTENT MONITORING MODEL OF CANOPY WATER OF WINTER WHEAT BASED ON SPECTRAL PARAMETERS

CROSS REFERENCE TO THE RELATED APPLICATIONS

This application is based upon and claims priority to Chinese Patent Application No. 201910416336.9, filed on May 20, 2019, the entire contents of which are incorporated herein by reference.

TECHNICAL FIELD

The present invention relates to the technical field of agricultural planting, and more particularly to a method for establishing a monitoring model of a water content of a winter wheat canopy based on spectral parameters.

BACKGROUND

Water is one of the main limiting factors in the process of crop growth, and its deficiency directly affects the plant's physiological and biochemical processes and morphological structure, which ultimately leads to yield reduction or poor quality for crop. Therefore, the large-scale real-time monitoring of plant water status has important theoretical and practical significance for improving crop water management and ensuring crop quality and efficiency. In order to ensure the stable and high yield of winter wheat, the water content of its plant canopy is necessarily taken into account to monitor dynamically, accurately and in real time, and thus the water shortage can be timely supplemented during the growth stage of the winter wheat through irrigation. The water deficiency causes the changes in physiological and biochemical characteristics of the winter wheat and the differences in the spectral characteristics of the winter wheat plant canopy, making it possible to use spectral technology to monitor the water content of the winter wheat plant canopy. In contrast, the traditional methods of monitoring water of plant such as a drying method, belong to destructive sampling, and are not only time-consuming and labor-intensive but also difficult to obtain the dynamic changes of water of individual plant. With the rapid development of spectroscopy technology in recent years, however, the spatio-temporal resolution of spectroscopy has been greatly improved, providing technical support for real-time dynamic and accurate non-destructive monitoring of water of large-area plants.

In recent years, scholars at home and abroad have conducted a lot of research on crop water spectral monitoring, and have established different crop water spectrum estimation models. Due to the influence of key factors such as the limitation of the sampling amount of destructive tests or the poor weather conditions during the growth stages, many research results are mostly limited to the construction of a spectral monitoring model for plant water content in a specific growth stage. Spectral characteristics of crops in different growth stages vary significantly, and it is questionable whether the spectral model of the specific growth stage can be applied to plant water content monitoring during the whole growth stage or not. In order to facilitate operation, relevant scholars also carried out a comparative study on the simulation effects of different models during different growth stages, and then proposed a spectral monitoring model suitable for plant water content during the whole growth stage. However, for the whole-growth-stage spectral monitoring model, the simulation accuracy and applicability thereof in different growth stages need to be further verified before it can benefit the application and promotion of the model. Due to the influence of variations of factors such as plant physiological structures and growth characteristics indices during different growth stages, the spectral reflectance during different growth stages also changes accordingly. There is a large difference in the simulation accuracy of different growth stages by using a specific whole-growth-stage spectral monitoring model, and in particular, the monitoring accuracy for the whole-growth-stage spectral monitoring model also needs to be improved to meet the need for precise management of crop plant water content.

As the spectral resolution increases, the spectral information data is enriched, but background and noise interference are also increased. Related research shows that the basic transformation such as reciprocal, logarithm and differential of reflection spectrum information can reduce the influence of background and noise, enhance spectral absorption and extraction characteristics, and improve simulation accuracy of the model. Parameters such as "trilateral" positions, amplitudes and areas, and spectral indices thereof constructed by such parameters and other information can better reflect the spectral characteristics of green vegetation, and the "trilateral" parameters are more sensitive to the leaf area index, the nitrogen content, and the chlorophyll content. However, at present, there are few studies on selecting the "trilateral" parameters to monitor the water content of crop plants. The use of comprehensive spectral parameters can effectively reduce the interference of background and noise, and can ensure that the monitoring model is stable and reliable. Therefore, the present invention integrates the spectral information basic transformation and the "trilateral" parameters and other spectral parameters. On this basis, a method for establishing a monitoring model of a water content of a winter wheat canopy for each growth stage can be provided to ensure the accuracy and stability of winter wheat canopy water monitoring in different growth stages.

SUMMARY

In view of the above deficiencies in the prior art, the present invention provides a method for establishing a monitoring model of a water content of a winter wheat canopy based on spectral parameters, which breaks through the limitation of plant canopy water content spectral monitoring restricted by growth stages and the influence of other background noises, and realizes the accurate and stable spectral monitoring of the whole growth stage of crops.

In order to achieve the above objective, the present invention adopts the following technical solution: a method for establishing a monitoring model of a water content of a winter wheat canopy based on spectral parameters, including the following steps:

S1: measuring a spectral reflectance and a water content of a winter wheat canopy;

S2: constructing the spectral parameters through the spectral reflectance; wherein, the spectral parameters include spectral transformation forms and "trilateral" parameters; and S3: performing correlation analysis on the water content of the winter wheat canopy and the spectral transformation forms and the "trilateral" parameters, selecting spectral parameters with a significant correlation for each growth stage, performing principal component analysis on the spectral parameters with the significant correlation, separately constructing a water content monitoring model with comprehensive spectral parameters for each growth stage by means of a result of the principal component analysis, and combining the water content monitoring model with the comprehensive spectral parameters for each growth stage into a monitoring model of the canopy water content with the comprehensive spectral parameters for a whole growth stage;

the growth stage includes a jointing-heading stage, a heading-filling stage and a filling-maturity stage.

Further, a method of measuring the spectral reflectance in step S1 is:

adopting a white board with a reflectance of 1 to calibrate before each monitoring, vertically downwardly monitoring a winter wheat canopy of 15 cm by a probe of a ground-object spectrometer, selecting three monitoring points, and using the hand-held ground-object spectrometer to monitor a spectrum of the winter wheat plant canopy, and taking an average value of three monitoring results as the spectral reflectance of the winter wheat canopy.

Further, a method of measuring the water content in step S1 is:

sampling a winter wheat plant after measuring the spectrum, weighing a fresh weight of the winter wheat plant, placing the winter wheat plant into an oven to inactivateing the winter wheat plant at 105° C. for 30 min, then adjusting a temperature of the oven to 75° C., drying the winter wheat plant to a constant weight, weighing a dry weight of the winter wheat plant, and calculating the water content of the winter wheat plant; wherein a formula for calculating the water content of the winter wheat plant is as follows:

$$\omega = (M_1 - M_2)/M_1,$$

wherein, $\omega$ is the water content, $M_1$ is the fresh weight, and $M_2$ is the constant weight.

Further, the spectral transformation forms in step S2 are to perform transform on the spectral reflectance and include division by $R_{450-750}$, division by $R_{930}$, reciprocal, logarithm of reciprocal, first-order differential of logarithm of reciprocal, first-order differential of reciprocal, logarithm, first-order differential of logarithm, an absorption depth of 670 nm and first-order differential;

the $R_{450-750}$ is an average value of reflectance in a band of 450 nm-750 nm, the $R_{930}$ is a reflectance value in a band of 930 nm, and a formula for calculating the absorption depth of 670 nm is as follows:

$$H_{670} = 1 - \left( \frac{B_{670}}{B_{670} + \frac{C_{760} - A_{560}}{670 - 560}} \right),$$

wherein, $A_{560}$ is a spectral reflectance at an absorption characteristic start point of 560 nm, $B_{670}$ is a spectral reflectance at an absorption characteristic center point of 670 nm, and $C_{760}$ is a spectral reflectance at an absorption characteristic end point of 760 nm.

Further, the "trilateral" parameters in step S2 include a red edge amplitude Dr, a red edge position $\lambda r$, a blue edge amplitude Db, a blue edge position $\lambda b$, a yellow edge amplitude Dy, a yellow edge position $\lambda y$, a green peak amplitude Rg, a green peak position $\lambda g$, a red valley amplitude Rr, a red valley position $\lambda v$, a red edge area SDr, a blue edge area SDb, a yellow edge area SDy, (Rg−Rr)/(Rg+Rr), Rg/Rr, SDr/SDb, SDr/SDy, (SDr−SDb), (SDr−SDb)/(SDr+SDb), and (SDr−SDy)/(SDr+SDy); and the red edge amplitude Dr is a maximum value in a first-order derivative spectrum in a red light range of 680-760 nm, and the red edge position $\lambda r$ is a wavelength position corresponding to the red edge amplitude Dr; the blue edge amplitude Db is a maximum value in a first-order derivative spectrum in a blue light range of 490 nm-530 nm, and the blue edge position $\lambda b$ is a wavelength position corresponding to the blue edge amplitude Db; the yellow edge amplitude Dy is a maximum value in a first-order derivative spectrum in a yellow light range of 560-640 nm, and the yellow edge position $\lambda y$ is a wavelength position corresponding to the yellow edge amplitude Dy; the green peak amplitude Rg is a maximum band reflectance in a green light range of 510-560 nm, and the green peak position $\lambda g$ is a wavelength position corresponding to the green peak amplitude Rg; the red valley amplitude Rr is a minimum band reflectance in a red light range of 640-680 nm, and the red valley location $\lambda v$ is a wavelength position corresponding to the red valley amplitude Rr.

Further, the comprehensive spectral parameters of the water content monitoring model in step S3 are selected with the significant correlation between the water content of the winter wheat canopy and the corresponding spectral transformation forms and the "trilateral" parameters during each growth stage as a standard, wherein the spectral parameters of the jointing-heading stage include: first-order differential of logarithm, first-order differential of logarithm of reciprocal, Rg/Rr, first-order differential, first-order differential of reciprocal, division by $R_{450-750}$, (Rg−Rr)/(Rg+Rr), reciprocal, and logarithm of reciprocal; the spectral parameters of the heading-filling stage include: division by $R_{930}$, SDr/SDy, (SDr−SDy)/(SDr+SDy), yellow edge area SDy, first-order differential, reciprocal, logarithm of reciprocal, logarithm, and first-order differential of reciprocal; and the spectral parameters of the filling-maturity stage include (Rg−Rr)/(Rg+Rr), Rg/Rr, division by $R_{450-750}$, first-order differential of logarithm, first-order differential of logarithm of reciprocal, (SDr−SDb)/(SDr+SDb), an original reflectance, red Valley amplitude Rr, and division by $R_{930}$.

Further, the monitoring model of the canopy water content in step S3 is as follows:

$$Y = \begin{cases} 0.0051M_1 - 0.011M_2 - 0.007M_3 + 0.756 & \text{(Jointing-heading stage)} \\ 0.018N_1 - 0.013N_2 + 0.004N_3 + 0.660 & \text{(Heading-filling stage)}, \\ -0.016L_1 + 0.005L_2 - 0.014L_3 + 0.540 & \text{(Filling-maturity stage)} \end{cases}$$

wherein, Y is the water content/($g \cdot g^{-1}$) of the winter wheat canopy, $M_1$ is a first principal component of the jointing-heading stage, $M_2$ is a second principal component of the jointing-heading stage, $M_3$ is a third principal component of the jointing-heading stage, $N_1$ is a first principal component of the heading-filling stage, $N_2$ is a second principal component of the heading-filling stage, $N_3$ is a third principal component of the heading-filling stage, $L_1$ is a first principal component of the filling-maturity stage, $L_2$ is a second principal component of the filling-maturity stage, and $L_3$ is a third main component of the filling-maturity stage;

$M_1 = 0.3489X_1 - 0.3489X_2 + 0.3542X_3 + 0.029X_4 - 0.3516X_5 + 0.3563X_6 + 0.3573X_7 + 0.3546X_8 + 0.3551X_9,$ $M_2 = -0.0182X_1 + 0.0182X_2 + 0.0020X_3 + 0.9962X_4 + 0.0717X_5 - 0.0120X_6 + 0.0373X_7 - 0.0191X_8 + 0.0178X_9,$ $M_3 = -0.5675X_1 + 0.5675X_2 + 0.0519X_3 + 0.0152X_4 - 0.4140X_5 + 0.1459X_6 - 0.0337X_7 + 0.3484X_8 + 0.1921X_9$ wherein, $X_1$ is first-order differential of logarithm, $X_2$ is first-order differential of logarithm of reciprocal, $X_3$ is Rg/Rr, $X_4$ is first-order differential, $X_5$ is first-order differential of reciprocal, $X_6$ is division by $R_{450\text{-}750}$, $X_7$ is (Rg−Rr)/(Rg+Rr), $X_8$ is reciprocal, and $X_9$ is logarithm of reciprocal;

$$N_1 = 0.3113Q_1 - 0.2973Q_2 - 0.3011Q_3 + 0.3626Q_4 + 0.3441Q_5 - 0.3544Q_6 - 0.3531Q_7 + 0.3531Q_8 + 0.3149Q_9,$$

$$N_2 = -0.1811Q_1 0.5257Q_2 + 0.5275Q_3 + 0.0676Q_4 + 0.1590Q_5 - 0.3216Q_6 - 0.3441Q_7 + 0.3441Q_8 - 0.2053Q_9,$$

$$N_3 = 0.6511Q_1 + 0.3235Q_2 + 0.2660Q_3 - 0.2341Q_4 - 0.2332Q_5 + 0.0289Q_6 + 0.0289Q_7 - 0.0289Q_8 + 0.5379Q_9,$$

wherein, $Q_1$ is division by $R_{930}$, $Q_2$ is SDr/SDy, $Q_3$ is (SDr−SDy)/(SDr+SDy), $Q_4$ is yellow edge area SDy, $Q_5$ is first-order differential, $Q_6$ is reciprocal, $Q_7$ is logarithm of reciprocal, $Q_8$ is logarithm, and $Q_9$ is first-order differential of reciprocal;

$$L_1 = -0.3301Z_1 - 0.3311Z_2 + 0.3417Z_3 - 0.3392Z_4 + 0.3392Z_5 - 0.3351Z_6 + 0.3197Z_7 + 0.3202Z_8 + 0.3428Z_9$$

$$L_2 = 0.4065Z_1 + 0.3971Z_2 - 0.2538Z_3 + 0.1021Z_4 - 0.1021Z_5 - 0.0844Z_6 + 0.5348Z_7 + 0.5232Z_8 + 0.1602Z_9$$

$$L_3 = -0.3082Z_1 - 0.2994Z_2 + 0.1956Z_3 + 0.5979Z_4 - 0.5979Z_5 + 0.0073Z_6 + 0.1196Z_7 + 0.1624Z_8 + 0.1461Z_9$$

wherein, $Z_1$ is (Rg−Rr)/(Rg+Rr), $Z_2$ is Rg/Rr, $Z_3$ is division by $R_{450\text{-}750}$, $Z_4$ is first-order differential of logarithm, $Z_5$ is first-order differential of logarithm of reciprocal, $Z_6$ is (SDr−SDb)/(SDr+SDb), $Z_7$ is the original reflectance, $Z_8$ is red valley amplitude Rr, and $Z_9$ is division by $R_{930}$.

The advantages of the present invention are as follows: in the present invention, according to the data of winter wheat canopy spectral reflectance and plant canopy water content of different growth stages under different water treatments, a correlation between spectral information basic transformation and "trilateral" parameters on the plant canopy water content is analyzed, a suitable model combination with high accuracy considering the characteristics of each growth stage is proposed, and a principal component estimation model for the plant canopy water content integrating the spectral information basic transformation and the "trilateral" parameters and other independent variables is constructed, breaking through the limitation of spectral monitoring restricted by growth stages and the influence of other background noises, and providing theoretical basis and technical support for the accurate hyperspectral diagnosis of winter wheat plant water content.

DETAILED DESCRIPTION OF THE EMBODIMENTS

Figure 1:
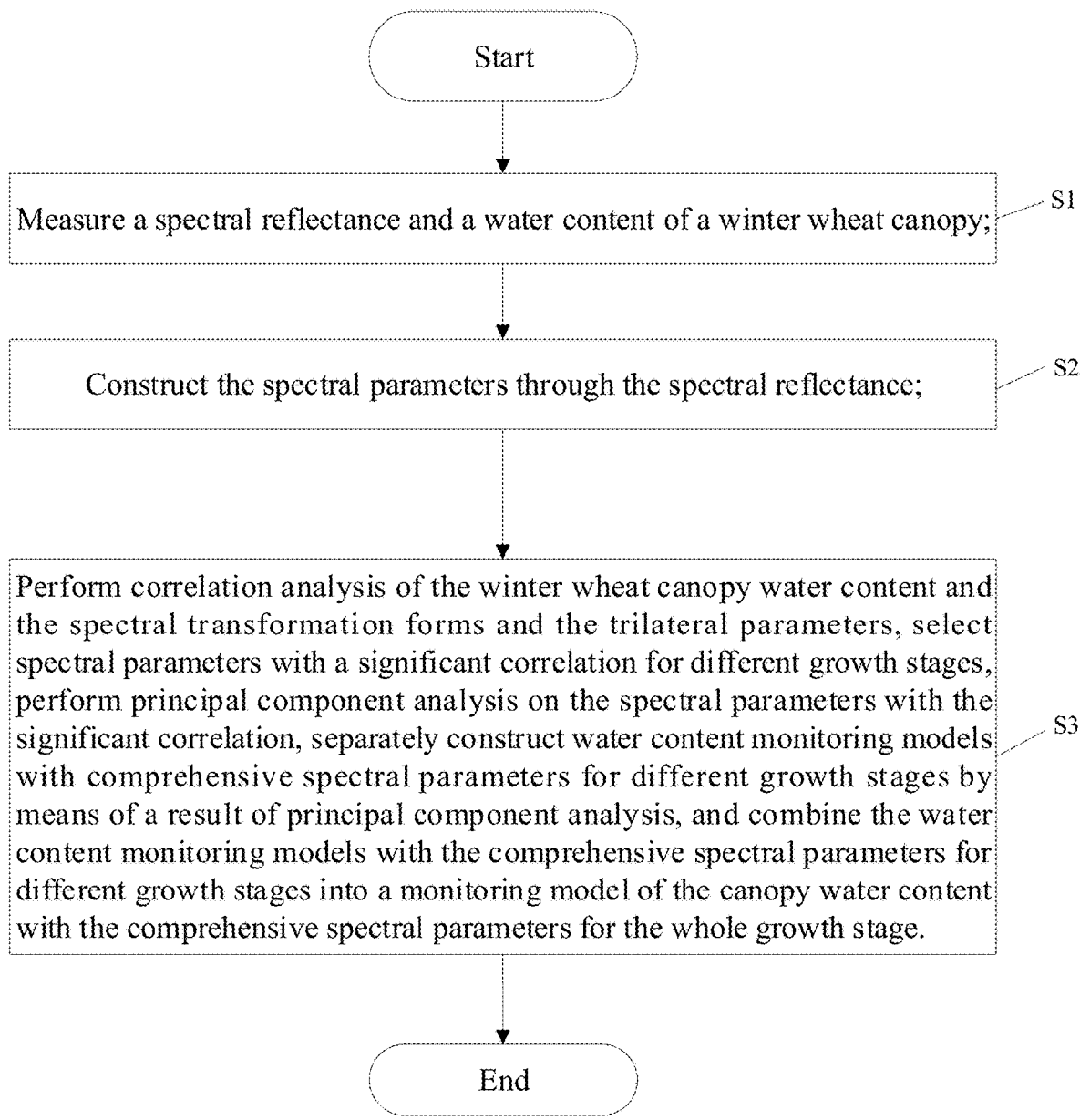
FIG. 1 is a flowchart of the present invention.
Figure 2A:
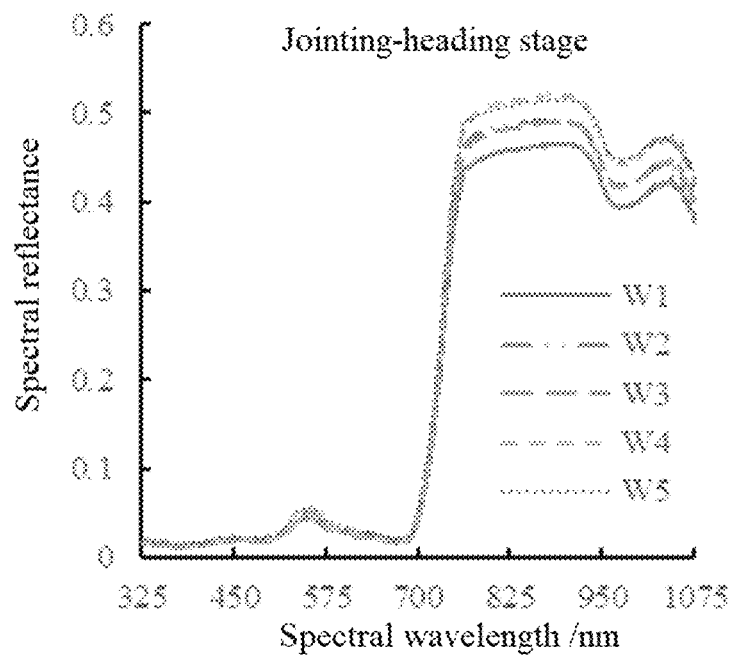
FIGS. 2A-2F are graphs of spectral characteristics of a winter wheat plant canopy under different water treatments.
Figure 2B:
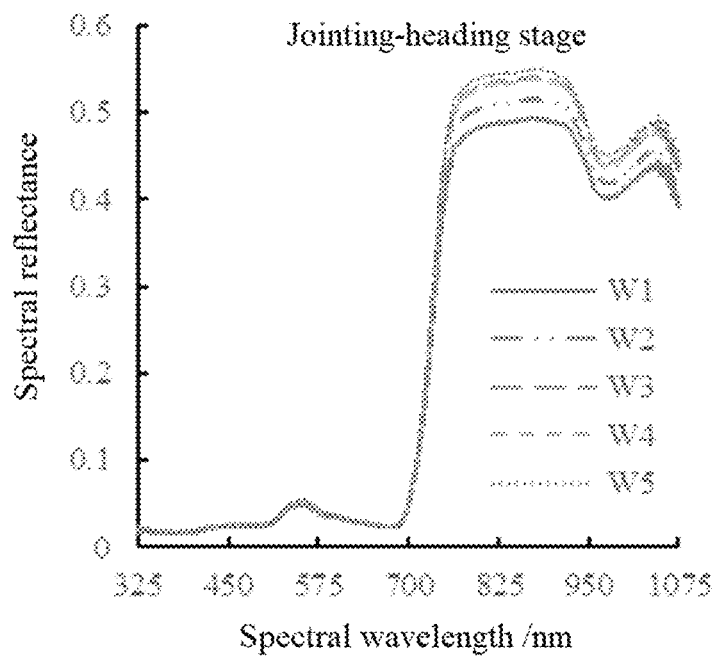
Figure 2C:
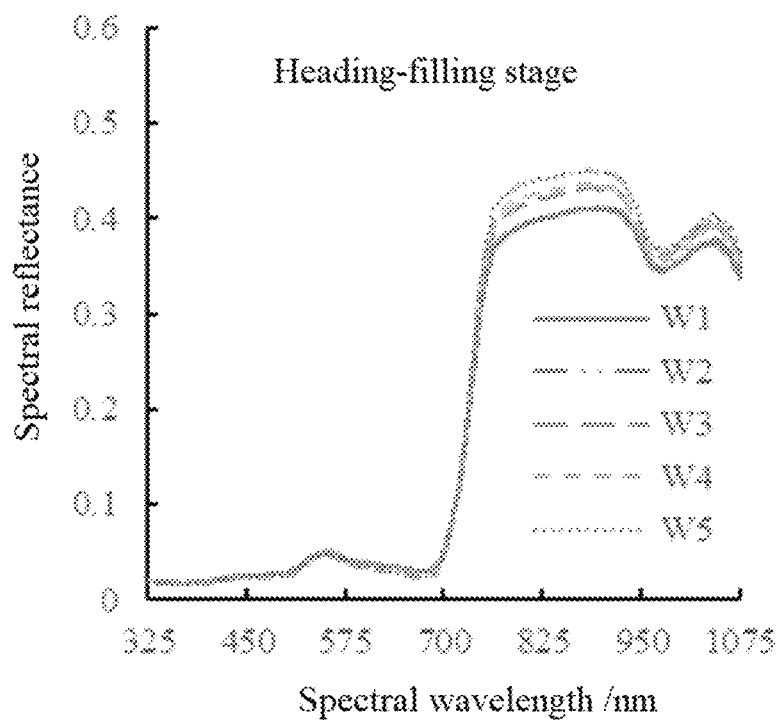
Figure 2D:
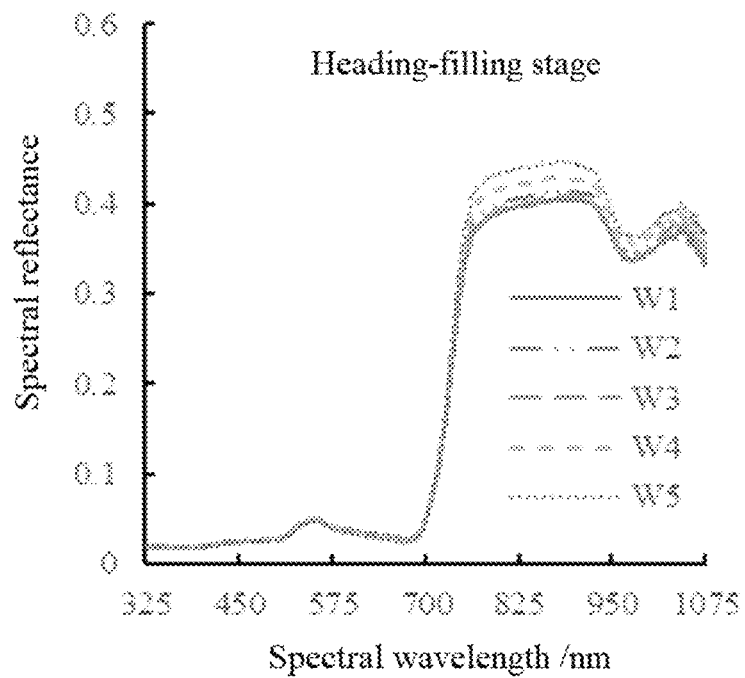
Figure 2E:
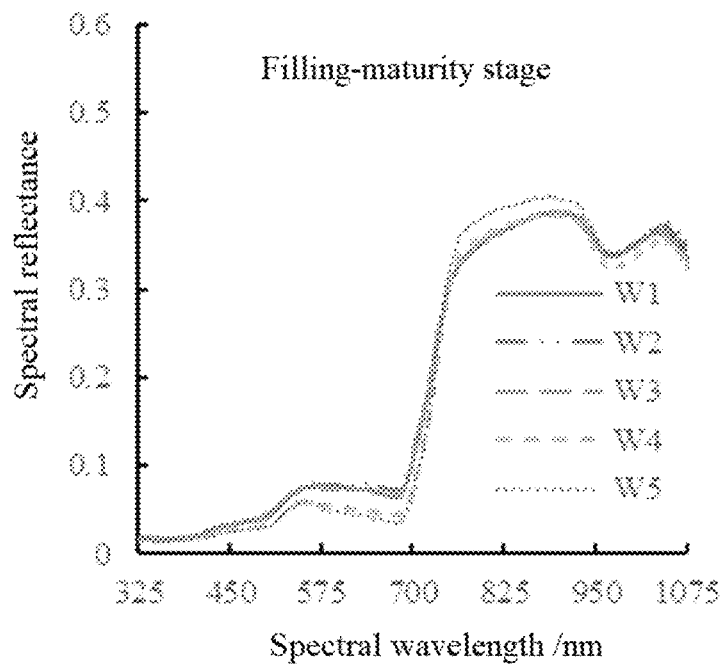
Figure 2F:
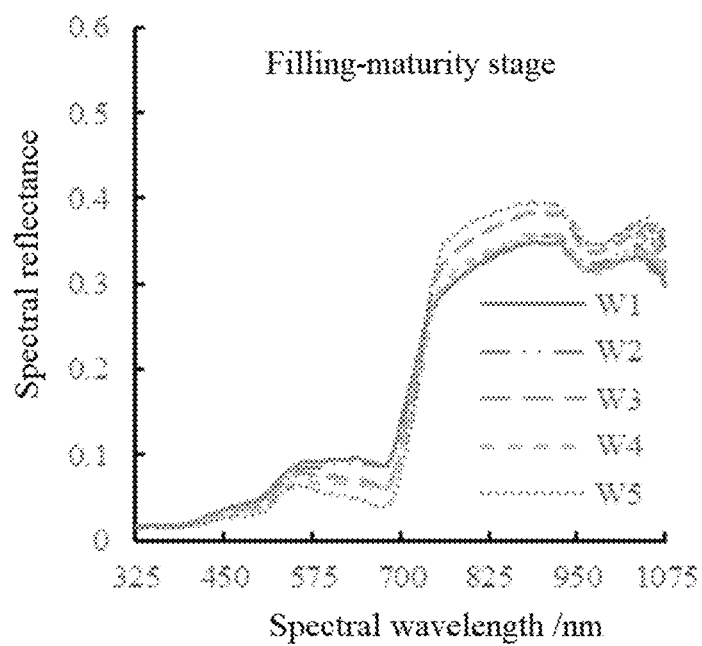

The specific embodiments of the present invention are described below so as to make those skilled in the art understand the present invention, but it should be clear that the present invention is not limited to the scope of the specific embodiments. For those of ordinary skill in the art, as long as different changes are made within the spirit and scope of the present invention as defined and determined by the appended claims, these changes are obvious and any invention using the concept of the present invention are included in the protection of the present invention.

A test sample of winter wheat is Zhongmai 175. The sowing and harvesting dates of winter wheat in 2016-2017 are Oct. 6, 2016 and Jun. 7, 2017, respectively; and the sowing and harvesting dates of winter wheat in 2017-2018 are Oct. 13, 2017 and Jun. 6, 2018, respectively. 5 stages of before sowing, sowing-overwintering stage, greening-jointing stage, jointing-heading stage and heading-filling stage are selected, irrigation 1 water, irrigation 2 water, irrigation 3 water, irrigation 4 water and irrigation 5 water are considered, respectively, and 5 water treatments, namely W1, W2, W3, W4 and W5, are set up. Each treatment is repeated 3 times. There are a total of 15 cells, and a cell area is about 60 m². See Table 1 for the irrigation status of each treatment. The source of the irrigation water is groundwater, and the irrigation water is measured by a water meter. Before sowing, a compound fertilizer (15% of N content, 15% of $P_2O_5$ content, and 15% of $K_2O$ content) is applied as a base fertilizer. During the greening-joint stage, topdressing urea is applied at a rate of 225 kg/hm² each time, and the fertilization levels are identical in all treatments. Field management, such as weeding, pest control, and other agronomic measures are consistent with local farmers' habits.

TABLE 1

Irrigation schedule of winter wheat

| No. | Irrigation before sowing | Sowing-overwintering | Greening-jointing | Jointing-heading | Heading-filling | Irrigation quota/mm |
|---|---|---|---|---|---|---|
| W1 | ✓ | | | | | 60 |
| W2 | ✓ | | | ✓ | | 120 |
| W3 | ✓ | ✓ | | ✓ | | 180 |
| W4 | ✓ | ✓ | | ✓ | ✓ | 240 |
| W5 | ✓ | ✓ | ✓ | ✓ | ✓ | 300 |

As shown in FIG. 1, a method for establishing a monitoring model of a water content of a winter wheat canopy based on spectral parameters, including the following steps:

S1: a spectral reflectance and a water content of a winter wheat canopy are measured.

A method of measuring the spectral reflectance is as follows: a white board with a reflectance of 1 is adopted to calibrate before each monitoring, a probe of a ground-object spectrometer is adopted to vertically downwardly monitor a winter wheat canopy of 15 cm, three monitoring points are selected, the hand-held ground-object spectrometer is adopted to monitor a spectrum of the winter wheat plant canopy, and an average value of three monitoring results is taken as the spectral reflectance of the winter wheat canopy. The ground-object spectrometer selects a Field-Spec Hand-Held 2 type hand-held ground-object spectrometer produced by American ASD Company. The ground-object spectrometer has an effective band range of 325-1075 nm, a sampling interval of 1 nm, and a resolution of 3 nm.

A method of measuring the water content is: a winter wheat plant is sampled after the spectrum is measured, the fresh weight of the winter wheat plant is weighed, the winter wheat plant is placed into an oven to be inactivated at 105° C. for 30 min, then a temperature of the oven is adjusted to 75° C., the winter wheat plant is dried to a constant weight, and the dry weight of the winter wheat plant is weighed, so that the water content of the winter wheat plant can be calculated; and a formula for calculating the water content of the winter wheat plant is as follows:

$$\omega = (M_1 - M_2)/M_1$$

wherein, $\omega$ is the water content, $M_1$ is the fresh weight, and $M_2$ is the constant weight.

S2: the spectral parameters are constructed through the spectral reflectance.

The spectral parameters include spectral transformation forms and "trilateral" parameters.

The spectral transformation forms in step S2 are to perform transform on the spectral reflectance. As shown in Table 2, the spectral transformation forms includes division by $R_{450-750}$, division by $R_{930}$, reciprocal, logarithm of reciprocal, first-order differential of logarithm of reciprocal, first-order differential of reciprocal, logarithm, first-order differential of logarithm, an absorption depth of 670 nm and first-order differential.

The $R_{450-750}$ is an average value of the reflectance in a band of 450 nm-750 nm, the $R_{930}$ is a reflectance value in a band of 930 nm, and a formula for calculating the absorption depth of 670 nm is as follows:

$$H_{670} = 1 - \left( \frac{B_{670}}{B_{670} + \frac{C_{760} - A_{560}}{670 - 560}} \right)$$

wherein, $A_{560}$ is a spectral reflectance at an absorption characteristic start point of 560 nm, $B_{670}$ is a spectral reflectance at an absorption characteristic center point of 670 nm, and $C_{760}$ is a spectral reflectance at an absorption characteristic end point of 760 nm.

TABLE 2

Calculation formulas of 11 spectral transformation forms

| Transformation form | Calculation formula |
| --- | --- |
| Original reflectance | R |
| Division by $R_{450-750}$ | $R/R_{450-750}$ |
| Division by $R_{930}$ | $R/R_{930}$ |
| Reciprocal | 1/R |
| Logarithm of reciprocal | Log(1/R) |
| First-order differential of logarithm of reciprocal | (Log(1/R))' |
| First-order differential of reciprocal | (1/R)' |
| Logarithm | Log (R) |
| First-order differential of logarithm | (Log(R))' |
| Absorption depth of 670 nm | H670 |
| First-order differential | (R)' |

As shown in Table 3, the "trilateral" parameters include a red edge amplitude Dr, a red edge position $\lambda r$, a blue edge amplitude Db, a blue edge position $\lambda b$, a yellow edge amplitude Dy, a yellow edge position $\lambda y$, a green peak amplitude Rg, a green peak position $\lambda g$, a red valley amplitude Rr, a red valley position $\lambda v$, a red edge area SDr, a blue edge area SDb, a yellow edge area SDy, (Rg−Rr)/(Rg+Rr), Rg/Rr, SDr/SDb, SDr/SDy, (SDr−SDb), (SDr−SDb)/(SDr+SDb), and (SDr−SDy)/(SDr+SDy).

The red edge amplitude Dr is a maximum value in a first-order derivative spectrum in a red light range of 680-760 nm, and the red edge position $\lambda r$ is a wavelength position corresponding to the red edge amplitude Dr; the blue edge amplitude Db is a maximum value in a first-order derivative spectrum in a blue light range of 490 nm-530 nm, and the blue edge position $\lambda b$ is a wavelength position corresponding to the blue edge amplitude Db; the yellow edge amplitude Dy is a maximum value in a first-order derivative spectrum in a yellow light range of 560-640 nm, and the yellow edge position $\lambda y$ is a wavelength position corresponding to the yellow edge amplitude Dy; the green peak amplitude Rg is a maximum band reflectance in a green light range of 510-560 nm, and the green peak position $\lambda g$ is a wavelength position corresponding to the green peak amplitude Rg; the red valley amplitude Rr is a minimum band reflectance in a red light range of 640-680 nm, and the red valley position $\lambda v$ is a wavelength position corresponding to the red valley amplitude Rr.

TABLE 3

Spectral characteristic parameters used herein

| Spectral parameter | Definition and algorithm |
| --- | --- |
| red edge amplitude Dr | Maximum value in a first-order derivative spectrum in a red light range of 680-760 nm |
| red edge position $\lambda r$ | Wavelength position (nm) corresponding to Dr |
| blue edge amplitude Db | Maximum value in a first-order derivative spectrum in a blue light range of 490-530 nm |
| blue edge position $\lambda b$ | Wavelength position (nm) corresponding to Db |
| yellow edge amplitude Dy | Maximum value in a first-order derivative spectrum in a yellow light range of 560-640 nm |
| yellow edge position $\lambda y$ | Wavelength position (nm) corresponding to Dy |
| Green peak amplitude Rg | Maximum band reflectance in a green light range of 510-560 nm |
| Green peak position $\lambda g$ | Wavelength position (nm) corresponding to Rg |
| Red valley amplitude Rr | Minimum band reflectance in a red light range of 640-680 nm |
| Red valley position $\lambda v$ | Wavelength position (nm) corresponding to Rr |
| red edge area SDr | Area surrounded by the first-order derivative spectrum in the red light range |
| blue edge area SDb | Area surrounded by the first-order derivative spectrum in the blue light range |
| yellow edge area SDy | Area surrounded by the first-order derivative spectrum in the yellow light range |
| (Rg − Rr)/(Rg + Rr) | Normalized value of the green peak reflectance and the red valley reflectance |
| Rg/Rr | Ratio of the green peak reflectance to the red valley reflectance |
| SDr/SDb | Ratio of the red edge area to the blue edge area |
| SDr/SDy | Ratio of the red edge area to the yellow edge area |
| (SDr − SDb) | Difference between the red edge area and the blue edge area |
| (SDr − SDb)/(SDr + SDb) | Normalized value of the red edge area and the blue edge area |
| (SDr − SDy)/(SDr + SDy) | Normalized value of the red edge area and the yellow edge area |

The water content of the winter wheat plant canopy under different water treatments is shown in Table 4 and Table 5. As the growth stages of the winter wheat advances, the plant water content generally shows a decreasing trend, wherein in 2016-2017, the plant water content is reduced from 0.762 of the jointing-heading stage to 0.528 of the filling-maturity stage, with a decrease of 44.3%; and in 2017-2018, the plant water content is reduced from 0.744 of the jointing-heading stage to 0.553 of the filling-maturity stage, with a decrease of 34.5%. Under different water treatments, with the increase of irrigation volume, the water content of the winter wheat plant canopy shows an increasing trend. In order to ensure that the soil has enough soil moisture before sowing for the wheat seedlings to sprout and the wheat seedlings come out evenly and healthily, all water treatments consider irrigation before sowing, and because of low temperature and small crop evapotranspiration in a stage after the irrigation before sowing and before jointing, different treatments have insignificant differences during jointing-heading stage. During the heading-filling stage, the difference in the plant canopy water content between the W1 treatment and other treatments in 2016-2017 reaches a significant level, while the difference in the plant canopy water content between the treatments in 2017-2018 is not significant. During the filling-maturity stage, the difference in the plant canopy water content between the W1 treatment and other treatments in 2016-2017 reaches a significant level, while the difference in the plant canopy water content between the W1 treatment and other treatments in 2017-2018 reaches a very significant level. The differences in the plant canopy water content during different growth stages in different years are not only caused by the difference in irrigation volumes, but also are restricted by precipitation and other meteorological factors during the growth stage of the winter wheat.

TABLE 4

Water content of winter wheat plant canopy under different water treatments in 2016-2017

|  | Jointing-heading stage/(g · g$^{-1}$) | Heading-filling stage/(g · g$^{-1}$) | Filling-maturity stage/(g · g$^{-1}$) |
|---|---|---|---|
| W1 | 0.748a | 0.609b | 0.486b |
| W2 | 0.755a | 0.618ab | 0.488b |
| W3 | 0.757a | 0.625ab | 0.530ab |
| W4 | 0.764a | 0.644ab | 0.552ab |
| W5 | 0.785a | 0.667a | 0.584a |
| Average value | 0.762 | 0.633 | 0.528 |

Note:
Different upper and lower case letters means significant difference at 1%, 5% level, the same as below.

TABLE 5

Water content of winter wheat plant canopy under different water treatments in 2017-2018

|  | Jointing-heading stage/(g · g$^{-1}$) | Heading-filling stage/(g · g$^{-1}$) | Filling-maturity stage(g · g$^{-1}$) |
|---|---|---|---|
| W1 | 0.729a | 0.696a | 0.481bB |
| W2 | 0.739a | 0.705a | 0.547aA |
| W3 | 0.743a | 0.721a | 0.553aA |
| W4 | 0.751a | 0.724a | 0.580aA |
| W5 | 0.758a | 0.726a | 0.602aA |
| Average value | 0.744 | 0.714 | 0.553 |

The spectral characteristics of the winter wheat plant canopy under different water treatments are shown in FIGS. 2A-2F. The variation trends of spectral characteristics of the plant canopy during different growth stages in each year are basically identical, that is, the spectral reflectance in the visible light band is relatively low, the spectral reflectance in the near-infrared band is relatively high, two obvious absorption valleys form in a blue-violet light band (350-500 nm) and a red light band (650-710 nm), and an obvious reflection peak forms in a green light band (500-600 nm), mainly because chlorophyll has the strong absorption of red light and blue light and the weak absorption of green light under crop photosynthesis. After 690 nm, the spectral reflectance rises sharply, forming a high reflection platform, that is, the so-called "red edge phenomenon" occurs at 690-740 nm. As the growth stage advances, especially in the near-infrared band (760-1075 nm), the spectral reflectance of the plant canopy shows a significantly decreasing trend, which is mainly due to changes in leaf tissue structure during different growth stages. The spectral characteristics of the plant canopy are different depending on the growth stages. The spectral monitoring data of the whole growth stage is used to establish a spectral estimation model, and whether it can meet the monitoring accuracy requirements of each growth stage needs to be further verified, otherwise it is difficult to achieve the expected effects when the model is used for spectral monitoring during a specific growth stage. In the visible light band range, with the increase of irrigation volume, the reflectance of the winter wheat plant canopy shows a decreasing trend, and in particular, the differences of the spectral reflectance between different water treatments reaches a very significant level in the filling-maturity stage. In contrast, in the near-infrared band range, with the increase of irrigation volume, the reflectance of the winter wheat plant canopy shows an increasing trend, and the differences of the spectral reflectance of the winter wheat plant canopy between different water treatments during each growth stage reach a very significant level. It can be seen that there are significant differences in the spectral reflectance of each growth stage between different water treatments, and the plant canopy water content corresponding to the spectral reflectance has a similar variation trend, which indirectly verifies the feasibility of using the spectral reflectance data to construct a winter wheat plant canopy water content estimation model.

Correlation analysis of the spectral transformation forms and the canopy water content of the winter wheat for different growth stage is performed. The spectral transformation forms and their sensitive bands with the maximum correlation for different growth stage are selected, and are used to construct the regression models 1 under different spectral transformation forms in each growth stage; and the spectral transformation form and its sensitive band with the maximum correlation for the whole growth stage are selected, and are used to construct a regression monitoring model 2 for the whole growth stage.

The calculation formula of the correlation is as follows:

$$r = \frac{\sum (x_i - \bar{x}) \cdot (y_i - \bar{y})}{\sqrt{\sum (x_i - \bar{x})^2 \cdot \sum (y_i - \bar{y})^2}}$$

wherein, r is the correlation, $x_i$ and $y_i$ are measured values, and $\bar{x}$ and $\bar{y}$ are measured average values.

Based on the principle of high correlation coefficients, the sensitive bands under different spectral transformation forms and their corresponding correlation coefficients are obtained and shown in Table 6. During the jointing-heading stage, except for the correlation corresponding to the absorption depth of 670 nm reaching a significant level, the correlations corresponding to the sensitive bands under other transformation forms all reach very significant levels. During the heading-filling stage, except for the correlation corresponding to the absorption depth of 670 nm not reaching a significant level, the correlations corresponding to the sensitive bands under other transformation forms all reach very significant levels. During the filling-maturity stage, the absolute values of the correlation coefficients of the sensitive bands under different spectral transformation forms are all greater than 0.615, and reach very significant levels. Compared with other growth stages, the correlation of the jointing-heading stage is relatively low, mainly because the difference in the water content of winter wheat plant canopy under different water treatments in this growth stage is not significant. The absolute values of the correlation coefficients are sorted from high to low to obtain the top three transformation forms of the specific growth stage, wherein the top three transformation forms for the jointing-heading stage are logarithm, absorption depth of 670 nm, and first-order differential, their corresponding sensitive bands are 697 nm, 697 nm, and 639 nm, respectively, and the absolute values of their corresponding correlation coefficients are 0.574, 0.574, and 0.539, respectively; the top three transformation forms for the heading-filling stage are division by $R_{930}$, first-order differential, and reciprocal, their corresponding sensitive bands are 756 nm, 703 nm, and 743 nm, respectively, and the absolute values of their corresponding correlation coefficients are 0.785, 0.666 and 0.647, respectively; and the top three transformation forms for the filling-maturity stage are division by $R_{450-750}$, logarithm, and absorption depth of 670 nm, their corresponding sensitive bands are 690 nm, 707 nm, and 707 nm, respectively, and the absolute values of their corresponding correlation coefficients are 0.786, 0.745 and 0.745, respectively. To sum up, it can be seen that the spectral transformation forms with relatively high correlation coefficients and the corresponding sensitive bands of the winter wheat plant canopy water content are different in different growth stages. Therefore, the use of spectral transformation to construct winter wheat plant canopy water content model needs to take into account the sensitive bands and their correlations under different spectral transformation forms in different growth stages to ensure that the simulation results are more reasonable.

ent "trilateral" parameters during a specific growth stage is relatively large. During the jointing-heading stage, the correlations corresponding to the green peak amplitude, the red valley amplitude, (Rg−Rr)/(Rg+Rr) and Rg/Rr reach a very significant level, the correlations corresponding to the blue edge amplitude, the blue edge area, SDr/SDb and (SDr−SDb)/(SDr+SDb) only reach a significant level, and the correlations corresponding to other "trilateral" parameters each do not reach a significant level. During the heading-filling stage, the correlations corresponding to the red edge amplitude, the blue edge amplitude, the green peak amplitude, the red edge area, the yellow edge area, the blue edge area, (Rg−Rr)/(Rg+Rr), Rg/Rr, (SDr−SDb), SDr/SDy and (SDr−SDy)/(SDr+SDy) each reach a very significant level, the correlation corresponding to the yellow edge amplitude only reaches a significant level, and the correlations corresponding to other 8 "trilateral" parameters such as the red edge position, the blue edge position, and the yellow edge position each do not reach a significant level. During the filling-maturity stage, the correlations corresponding to the red edge amplitude, the red edge position, the blue edge amplitude, the blue edge position, and the yellow edge position do not reach a significant level, and the correlation corresponding to SDr/SDy only reaches a significant level, the correlations corresponding to other 14 "trilateral" parameters such as the yellow edge amplitude, the green peak amplitude, and the green peak position each reach a very significant level. For the different growth stages, the absolute values of the correlation coefficients are sorted from high to low to obtain the top three "trilateral" parameters of each growth stage. The top three "trilateral" parameters for the joint-heading stage are Rg/Rr, (Rg−Rr)/(Rg+Rr) and the red valley amplitude, and the absolute values of their cor-

TABLE 6

Correlation coefficients of different spectral transformation forms and plant water content during different growth stages of winter wheat

| Transformation form | Jointing-heading stage | | Heading-filling stage | | Filling-maturity stage | |
| --- | --- | --- | --- | --- | --- | --- |
| Original reflectance | 670 nm | −0.470** | 751 nm | 0.569** | 690 nm | −0.721** |
| Division by $R_{450-750}$ | 762 nm | 0.519** | 720 nm | 0.381** | 690 nm | −0.786** |
| Division by $R_{930}$ | 758 nm | −0.482** | 756 nm | 0.785** | 694nm | −0.713** |
| Reciprocal | 659 nm | 0.515** | 743 nm | −0.647** | 695 nm | 0.642** |
| Logarithm of reciprocal | 653 nm | 0.512** | 739 nm | −0.620** | 677 nm | 0.695** |
| First-order differential of logarithm of reciprocal | 653 nm | −0.512** | 739 nm | 0.620** | 677 nm | −0.695** |
| First-order differential of reciprocal | 670 nm | 0.396* | 670 nm | 0.288 | 670 nm | 0.634** |
| Logarithm | 697 nm | 0.574** | 561 nm | −0.552** | 707 nm | 0.745** |
| First-order differential of logarithm | 694 nm | −0.532** | 769 nm | 0.614** | 698 nm | −0.681** |
| Absorption depth of 670 nm | 697 nm | −0.574** | 561 nm | 0.552** | 707 nm | −0.745** |
| First-order differential | 639 nm | 0.539** | 703 nm | 0.666** | 689 nm | −0.615** |

Note:
* and ** means significantly differences at 5% and 1% levels, respectively.
The same as below.

Based on the principle of the highest correlation coefficient, the correlation coefficients between different "trilateral" parameters and the winter wheat plant canopy water content are obtained and shown in Table 7, and the difference of the significant correlations corresponding to differresponding correlation coefficients are 0.552, 0.519, and 0.485, respectively. The top three "trilateral" parameters for the heading-filling stage are SDr/SDy, (SDr−SDy)/(SDr+SDy) and the yellow edge area, and the absolute values of their corresponding correlation coefficients are 0.736, 0.731, and 0.697, respectively. The top three "trilateral" parameters for the filling-maturity stage are (Rg−Rr)/(Rg+Rr), Rg/Rr and (SDr−SDb)/(SDr+SDb), and the absolute values of their corresponding correlation coefficients are 0.798, 0.796 and 0.724, respectively. To sum up, it can be seen that the "trilateral" parameters with relatively high correlation coefficients of the winter wheat plant canopy water content are not identical in different growth stages. In order to ensure accurate and reasonable estimation results, when the "trilateral" parameters are used to construct the winter wheat plant canopy water content model, the characteristics of correlation differences during different growth stages should be considered.

TABLE 7

Correlation coefficients of "trilateral" parameters and plant water content during different growth stages of winter wheat

| Spectral parameter | Jointing-heading stage | Heading-filling stage | Filling-maturity stage |
|---|---|---|---|
| red edge amplitude Dr | −0.167 | 0.470** | 0.201 |
| red edge position $\lambda r$ | −0.036 | 0.197 | 0.106 |
| blue edge amplitude Db | −0.368* | 0.519** | −0.099 |
| blue edge position $\lambda b$ | 0.032 | 0.128 | 0.248 |
| yellow edge amplitude Dy | 0.303 | −0.369* | −0.509** |
| yellow edge position $\lambda y$ | −0.044 | −0.221 | 0.098 |
| Green peak amplitude Rg | −0.470** | 0.429** | −0.479** |
| Green peak position $\lambda g$ | −0.248 | −0.195 | −0.622** |
| Red valley amplitude Rr | −0.485** | 0.147 | −0.716** |
| Red valley position $\lambda v$ | −0.259 | 0.242 | 0.389** |
| red edge area SDr | 0.044 | 0.540** | 0.411** |
| blue edge area SDb | −0.400* | 0.575** | −0.391** |
| yellow edge area SDy | 0.049 | 0.697** | 0.486** |
| (Rg − Rr)/(Rg + Rr) | 0.519** | 0.493** | 0.798** |
| Rg/Rr | 0.552** | 0.519** | 0.796** |
| SDr/SDb | 0.375* | −0.087 | 0.660** |
| SDr/SDy | −0.074 | −0.736** | −0.323* |
| (SDr − SDb) | 0.095 | 0.531** | 0.453** |
| (SDr − SDb)/(SDr + SDb) | 0.390* | −0.107 | 0.724** |
| (SDr − SDy)/(SDr + SDy) | −0.139 | −0.731** | −0.404** |

S3: correlation analysis is performed on the water content of the winter wheat canopy and the spectral transformation forms and the "trilateral" parameters, spectral parameters with a significant correlation for each growth stage are selected, principal component analysis is performed on the spectral parameters with the significant correlation, a water content monitoring model with comprehensive spectral parameters for each growth stage are separately constructed by means of a result of the principal component analysis, and the water content monitoring model with the comprehensive spectral parameters for each growth stage are combined into a monitoring model of the canopy water content with the comprehensive spectral parameters for the whole growth stage.

The growth stages include the jointing-heading stage, the heading-filling stage and the filling-maturity stage.

The comprehensive spectral parameters of the water content monitoring model in step S3 are selected with the significant correlation between the water content of the winter wheat canopy and the corresponding spectral transformation forms and the "trilateral" parameters during each growth stage as a standard, wherein the spectral parameters of the jointing-heading stage include: first-order differential of logarithm, first-order differential of logarithm of reciprocal, Rg/Rr, first-order differential, first-order differential of reciprocal, division by $R_{450-750}$, (Rg−Rr)/(Rg+Rr), reciprocal, and logarithm of reciprocal; the spectral parameters of the heading-filling stage include: division by $R_{930}$, SDr/SDy, (SDr−SDy)/(SDr+SDy), yellow edge area SDy, first-order differential, reciprocal, logarithm of reciprocal, logarithm, and first-order differential of reciprocal; and the spectral parameters of the filling-maturity stage include (Rg−Rr)/(Rg+Rr), Rg/Rr, division by $R_{450-750}$, first-order differential of logarithm, first-order differential of logarithm of reciprocal, (SDr−SDb)/(SDr+SDb), original reflectance, red Valley amplitude Rr, and division by $R_{930}$.

According to the correlation coefficients of key parameters during each growth stage, as shown in Tables 8-10, during the jointing-heading stage, except for the correlation coefficients between the first-order differential and other parameters that are relatively small and do not reach a significant level, the absolute values of the correlation coefficients between the other parameters are each greater than 0.877, and all reach very significant levels; during the heading-filling stage, the absolute values of the correlation coefficients between the key parameters are each greater than 0.503, and the corresponding correlations all reach a very significant level; and during the filling-maturity stage, the absolute values of the correlation coefficients between the key parameters are each greater than 0.746, and the corresponding correlations all reach a very significant level. Therefore, it indicates that there is multiple collinearity between the key spectral parameters, and thus when the key parameters are selected to establish the model by means of multiple regression, the prediction accuracy of the multiple linear regression estimation model will be reduced due to the overlapping of information between the key spectral parameters.

TABLE 8

Correlation coefficients between spectral parameters during jointing-heading stage

| | First-order differential of logarithm | First-order differential of logarithm of reciprocal | Rg/Rr | First-order differential | First-order differential of reciprocal | Division by $R_{450-750}$ | (Rg−Rr)/(Rg + Rr) | Reciprocal | Logarithm of reciprocal |
|---|---|---|---|---|---|---|---|---|---|
| First-order differential of logarithm | 1 | | | | | | | | |

TABLE 8-continued

Correlation coefficients between spectral parameters during jointing-heading stage

| | First-order differential of logarithm | First-order differential of logarithm of reciprocal | Rg/Rr | First-order differential | First-order differential of reciprocal | Division by $R_{450-750}$ | (Rg-Rr)/ (Rg + Rr) | Reciprocal | Logarithm of reciprocal |
|---|---|---|---|---|---|---|---|---|---|
| First-order differential of logarithm of reciprocal | −1.000** | 1 | | | | | | | |
| Rg/Rr | 0.915** | −0.915** | 1 | | | | | | |
| First-order differential | 0.023 | −0.023 | −0.024 | 1 | | | | | |
| First-order differential of reciprocal | −0.877** | 0.877** | −0.940** | −0.053 | 1 | | | | |
| Division by $R_{450-750}$ | 0.919** | −0.919** | 0.941** | −0.011 | −0.955** | 1 | | | |
| (Rg-Rr)/ (Rg + Rr) | 0.934** | −0.934** | 0.987** | −0.064 | −0.934** | 0.952** | 1 | | |
| Reciprocal | 0.895** | −0.895** | 0.937** | 0.023 | −0.978** | 0.960** | 0.933** | 1 | |
| Logarithm of reciprocal | 0.912** | −0.912** | 0.926** | −0.023 | −0.948** | 0.959** | 0.949** | 0.972** | 1 |

TABLE 9

Correlation coefficients between spectral parameters during heading-filling stage

| | Division by $R_{930}$ | SDr/SDy | (SDr-SDy)/ (SDr + SDy) | yellow edge area SDy | First-order differential | Reciprocal | Logarithm of reciprocal | Logarithm | First-order differential of reciprocal |
|---|---|---|---|---|---|---|---|---|---|
| Division by $R_{930}$ | 1 | | | | | | | | |
| SDr/SDy | −0.653** | 1 | | | | | | | |
| (SDr-SDy)/ (SDr + SDy) | −0.682** | 0.990** | 1 | | | | | | |
| yellow edge area SDy | 0.656** | −0.721** | −0.725** | 1 | | | | | |
| First-order differential | 0.622** | −0.621** | −0.627** | 0.830** | 1 | | | | |
| Reciprocal | −0.683** | 0.525** | 0.529** | −0.903** | −0.865** | 1 | | | |
| Logarithm of reciprocal | −0.669** | 0.503** | 0.510** | −0.903** | −0.879** | 0.995** | 1 | | |
| Logarithm | 0.669** | −0.503** | −0.510** | 0.903** | 0.879** | −0.995** | −1.000** | 1 | |
| First-order differential of reciprocal | 0.778** | −0.671** | −0.692** | 0.725** | 0.654** | −0.653** | −0.654** | 0.654** | 1 |

TABLE 10

Correlation coefficients between spectral parameters during filling-maturity stage

| | (Rg-Rr)/ (Rg + Rr) | (Rg-Rr) | Division by $R_{450-750}$ | First-order differential of logarithm | First-order differential of logarithm of reciprocal | (SDr-SDb)/ (SDr + SDb) | Original reflectance | Red valley amplitude Rr | Division by R930 |
|---|---|---|---|---|---|---|---|---|---|
| (Rg-Rr)/ (Rg + Rr) | 1 | | | | | | | | |
| Rg/Rr | 0.996** | 1 | | | | | | | |
| Division by $R_{450-750}$ | −0.978** | −0.969** | 1 | | | | | | |

TABLE 10-continued

Correlation coefficients between spectral parameters during filling-maturity stage

| | (Rg/Rr)/ (Rg + Rr) | (Rg-Rr)/ | Division by $R_{450-750}$ | First-order differential of logarithm | First-order differential of logarithm of reciprocal | (SDr-SDb)/ (SDr + SDb) | Original reflectance | Red valley amplitude Rr | Division by R930 |
|---|---|---|---|---|---|---|---|---|---|
| First-order differential of logarithm | 0.900** | 0.899** | −0.923** | 1 | | | | | |
| First-order differential of logarithm of reciprocal | −0.900** | −0.899** | 0.923** | −1.000** | 1 | | | | |
| (SDr-SDb)/ (SDr + SDb) | 0.863** | 0.846** | −0.934** | 0.897** | −0.897** | 1 | | | |
| Original reflectance | −0.760** | −0.746** | 0.806** | −0.833** | 0.833** | −0.865** | 1 | | |
| Red valley amplitude Rr | −0.770** | −0.757** | 0.802** | −0.832** | 0.832** | −0.858** | 0.993** | 1 | |
| Division by $R_{930}$ | −0.893** | −0.879** | 0.924** | −0.908** | 0.908** | −0.950** | 0.917** | 0.924** | 1 |

Principal component analysis is performed to eliminate the collinearity between independent variables to improve the prediction accuracy of the model. The present invention screens and determines key spectral parameters for each growth stage of the winter wheat for principal component analysis, and fixes the number of principal component factors for each growth stage to 3, wherein the cumulative contribution rates from the jointing-heading stage, the heading-filling stage and the filling-maturity stage are 97.6%, 94.7%, and 97.8%, respectively, indicating that the principal components determined during each growth stage can represent more than 94% of information of the comprehensive spectral parameters. On this basis, the canopy water content monitoring model with the comprehensive spectral parameters during the whole growth stage of the winter wheat is established as follows:

$$Y = \begin{cases} 0.0051M_1 - 0.011M_2 - 0.007M_3 + 0.756 & \text{(Jointing-heading stage)} \\ 0.018N_1 - 0.013N_2 + 0.004N_3 + 0.660 & \text{(Heading-filling stage)} \\ -0.016L_1 + 0.005L_2 - 0.014L_3 + 0.540 & \text{(Filling-maturity stage)} \end{cases}$$

wherein, Y is the water content/(g·g$^{-1}$) of the winter wheat canopy, $M_1$ is a first principal component of the jointing-heading stage, $M_2$ is a second principal component of the jointing-heading stage, $M_3$ is a third principal component of the jointing-heading stage, $N_1$ is a first principal component of the heading-filling stage, $N_2$ is a second principal component of the heading-filling stage, $N_3$ is a third principal component of the heading-filling stage, $L_1$ is a first principal component of the filling-maturity stage, $L_2$ is a second principal component of the filling-maturity stage, $L_3$ is a third main component of the filling-maturity stage;

$M_1$=0.3489$X_1$−0.3489$X_2$+0.3542$X_3$+0.029$X_4$−0.3516$X_5$+0.3563$X_6$+0.3573$X_7$+0.3546$X_8$+0.3551$X_9$ $M_2$=−0.0182$X_1$+0.0182$X_2$+0.0020$X_3$+0.9962$X_4$+0.0717$X_5$−0.0120$X_6$+0.0373$X_7$−0.0191$X_8$+0.0178$X_9$ $M_3$=−0.5675$X_1$+0.5675$X_2$+0.0519$X_3$+0.0152$X_4$−0.4140$X_5$+0.1459$X_6$−0.0337$X_7$+0.3484$X_8$+0.1921$X_9$ wherein, $X_1$ is first-order differential of logarithm, $X_2$ is first-order differential of logarithm of reciprocal, $X_3$ is Rg/Rr, $X_4$ is first-order differential, $X_5$ is first-order differential of reciprocal, $X_6$ is division by $R_{450-750}$, $X_7$ is (Rg−Rr)/(Rg+Rr), $X_8$ is reciprocal, and $X_9$ is logarithm of reciprocal;

$N_1$=0.3113$Q_1$−0.2973$Q_2$−0.3011$Q_3$+0.3626$Q_4$+0.3441$Q_5$−0.3544$Q_6$−0.3531$Q_7$+0.3531$Q_8$+0.3149$Q_9$ $N_2$=−0.1811$Q_1$+0.5257$Q_2$+0.5275$Q_3$+0.0676$Q_4$+0.1590$Q_5$−0.3216$Q_6$−0.3441$Q_7$+0.3441$Q_8$−0.2053$Q_9$ $N_3$=0.6511$Q_1$+0.3235$Q_2$+0.2660$Q_3$−0.2341$Q_4$−0.2332$Q_5$+0.0289$Q_6$+0.0289$Q_7$−0.0289$Q_8$+0.5379$Q_9$ wherein, $Q_1$ is division by $R_{930}$, $Q_2$ is SDr/SDy, $Q_3$ is (SDr−SDy)/(SDr+SDy), $Q_4$ is the yellow edge area SDy, $Q_5$ is first-order differential, $Q_6$ is reciprocal, $Q_7$ is logarithm of reciprocal, $Q_8$ is logarithm, and $Q_9$ is first-order differential of reciprocal;

$L_1$=−0.3301$Z_1$−0.3311$Z_2$+0.3417$Z_3$−0.3392$Z_4$+0.3392$Z_5$−0.3351$Z_6$+0.3197$Z_7$+0.3202$Z_8$+0.3428$Z_9$ $L_2$=0.4065$Z_1$+0.3971$Z_2$−0.2538$Z_3$+0.1021$Z_4$−0.1021$Z_5$−0.0844$Z_6$+0.5348$Z_7$+0.5232$Z_8$+0.1602$Z_9$ $L_3$=−0.3082$Z_1$−0.2994$Z_2$+0.1956$Z_3$+0.5979$Z_4$−0.5979$Z_5$+0.0073$Z_6$+0.1196$Z_7$+0.1624$Z_8$+0.1461$Z_9$ wherein, $Z_1$ is (Rg−Rr)/(Rg+Rr), $Z_2$ is Rg/Rr, $Z_3$ is division by $R_{450-750}$, $Z_4$ is first-order differential of logarithm, $Z_5$ is first-order differential of logarithm of reciprocal, $Z_6$ is (SDr−SDb)/(SDr+SDb), $Z_7$ is the original reflectance, $Z_8$ is the red valley amplitude Rr, and $Z_9$ is division by $R_{930}$.

Evaluation indices include a determination coefficient, a root mean square error and an mean absolute error;

the calculation formula of the determination coefficient $R^2$ is:

$$R^2 = \frac{\sum (y_i - y_i')^2}{\sum (\overline{y} - y_i)^2}$$

the calculation formula of the root mean square error RMSE is:

$$RMSE = \sqrt{\frac{\sum_{i=1}^{n}(y_i' - y_i)^2}{n}}$$

the calculation formula of the mean absolute error MAE is:

$$MAE = \frac{\sum_{i=1}^{n}|y_i' - y_i|}{n}$$

wherein, $y_i$ is a measured value, $y_i'$ is a predicted value, $\overline{y}$ is a measured average value, and n is the number of samples.

As shown in Table 11, the determination coefficient $R^2$, the root mean square error RMSE and the mean absolute error MAE are used as evaluation indices to comprehensively evaluate the monitoring model of the water content of the winter wheat canopy. The results show that during the jointing-heading stage, $R^2$ is 0.564, RMSE is 0.015, and MAE is 0.012; during the heading-filling stage, $R^2$ is 0.657, RMSE is 0.036, MAE is 0.029; and during the filling-maturity stage, $R^2$ is 0.640, RMSE is 0.034 and MAE is 0.029. It can be seen that when the constructed canopy water content monitoring model with the comprehensive spectral parameters for the whole growth stage of the winter wheat is used to monitor the water content during each growth stage of the winter wheat, the determination coefficient $R^2$ is greater than 0.564, the root mean square error RMSE is less than 0.036, and the mean absolute error MAE is less than 0.029. Therefore, the canopy water content monitoring model with the comprehensive spectral parameters for the whole growth stage constructed by the present invention has high estimation accuracy during the whole growth stage and each growth stage, which can provide a basis for the monitoring, diagnosis and irrigation regulation of the water content of the winter wheat canopy.

TABLE 11

| | Evaluation indices of model | | |
| --- | --- | --- | --- |
| Growth stage | $R^2$ | RMSE/(g · g$^{-1}$) | MAE/(g · g$^{-1}$) |
| Jointing-heading stage | 0.564 | 0.015 | 0.012 |
| Heading-filling stage | 0.657 | 0.036 | 0.029 |
| Filling-maturity stage | 0.640 | 0.034 | 0.029 |

What is claimed is:

1. A method for establishing a monitoring model of a water content of a winter wheat canopy based on spectral parameters, comprising the following steps:

S1: measuring a spectral reflectance and a water content of the winter wheat canopy;

S2: constructing the spectral parameters through the spectral reflectance; wherein, the spectral parameters comprise spectral transformation forms and trilateral parameters; and S3: performing correlation analysis on the water content of the winter wheat canopy and the spectral transformation forms and the trilateral parameters, selecting comprehensive spectral parameters from first-order differential of logarithm, first-order differential of logarithm of reciprocal, Rg/Rr, first-order differential, first-order differential of reciprocal, division by $R_{450-750}$, (Rg−Rr)/(Rg+Rr), reciprocal, and logarithm of reciprocal; the comprehensive spectral parameters of a heading-filling stage comprise: division by $R_{930}$, SDr/SDy, (SDr−SDy)/(SDr+SDy), a yellow edge area SDy, first-order differential, reciprocal, logarithm of reciprocal, logarithm, and first-order differential of reciprocal; and the comprehensive spectral parameters of a filling-maturity stage comprise (Rg−Rr)/(Rg+Rr), Rg/Rr, division by $R_{450-750}$, first-order differential of logarithm, first-order differential of logarithm of reciprocal, (SDr−SDb)/(SDr+SDb), an original reflectance, a red Valley amplitude Rr, and division by $R_{930}$ with a significant correlation of the spectral parameters for each growth stage of growth stages, performing principal component analysis on the comprehensive spectral parameters with the significant correlation, separately constructing a water content monitoring model with the comprehensive spectral parameters for the each growth stage by a result of the principal component analysis, and combining the water content monitoring model with the comprehensive spectral parameters for the each growth stage into the monitoring model of the water content of the winter wheat canopy with the comprehensive spectral parameters for a whole growth stage; wherein the growth stages comprises a jointing-heading stage, the heading-filling stage and the filling-maturity stage;

the spectral transformation forms in step S2 are to perform transform on an original spectral reflectance and comprise division by $R_{450-750}$, division by $R_{930}$, reciprocal, logarithm of reciprocal, first-order differential of logarithm of reciprocal, first-order differential of reciprocal, logarithm, first-order differential of logarithm, an absorption depth of 670 nm and first-order differential;

the $R_{450-750}$ is an average value of reflectance in a band of 450 nm-750 nm, the $R_{930}$ is a reflectance value in a band of 930 nm, and a formula for calculating the absorption depth of 670 nm is as follows:

$$H_{670} = 1 - \left( \frac{B_{670}}{B_{670} + \frac{C_{760} - A_{560}}{670 - 560}} \right),$$

wherein, $A_{560}$ is a spectral reflectance at an absorption characteristic start point of 560 nm, $B_{670}$ is a spectral reflectance at an absorption characteristic center point of 670 nm, and $C_{760}$ is a spectral reflectance at an absorption characteristic end point of 760 nm;

the trilateral parameters in step S2 comprise a red edge amplitude Dr, a red edge position λr, a blue edge amplitude Db, a blue edge position λb, a yellow edge amplitude Dy, a yellow edge position λy, a green peak amplitude Rg, a green peak position λg, the red valley amplitude Rr, a red valley position λv, a red edge area SDr, a blue edge area SDb, the yellow edge area SDy, (Rg−Rr)/(Rg+Rr), Rg/Rr, SDr/SDb, SDr/SDy, (SDr−SDb), (SDr−SDb)/(SDr+SDb), and (SDr−SDy)/(SDr+SDy); and the red edge amplitude Dr is a maximum value in a first-order derivative spectrum in a red light range of 680-760 nm, and the red edge position λr is a wavelength position corresponding to the red edge amplitude Dr; the blue edge amplitude Db is a maximum value in a first-order derivative spectrum in a blue light range of 490 nm-530 nm, and the blue edge position λb is a wavelength position corresponding to the blue edge amplitude Db; the yellow edge amplitude Dy is a maximum value in a first-order derivative spectrum in a yellow light range of 560-640 nm, and the yellow edge position λy is a wavelength position corresponding to the yellow edge amplitude Dy; the green peak amplitude Rg is a maximum band reflectance in a green light range of 510-560 nm, and the green peak position λg is a wavelength position corresponding to the green peak amplitude Rg; the red valley amplitude Rr is a minimum band reflectance in a red light range of 640-680 nm, and the red valley location λv is a wavelength position corresponding to the red valley amplitude Rr; the red edge area SDr is an area surrounded by the first-order derivative spectrum in the red light range, the blue edge area SDb is an area surrounded by the first-order derivative spectrum in the blue light range, and the yellow edge area SDy is an area surrounded by the first-order derivative spectrum in the yellow light range;

the comprehensive spectral parameters of the water content monitoring model in step S3 are selected according to the significant correlation between the water content of the winter wheat canopy and the spectral transformation forms and the trilateral parameters during the each growth stage;

the monitoring model of the water content of the winter wheat canopy in step S3 is as follows:

$$Y = \begin{cases} 0.0051M_1 - 0.011M_2 - 0.007M_3 + 0.756 & \text{(Jointing-heading stage)} \\ 0.018N_1 - 0.013N_2 + 0.004N_3 + 0.660 & \text{(Heading-filling stage)}, \\ -0.016L_1 + 0.005L_2 - 0.014L_3 + 0.540 & \text{(Filling-maturity stage)} \end{cases}$$

wherein, Y is the water content of the winter wheat canopy, $M_1$ is a first principal component of the jointing-heading stage, $M_2$ is a second principal component of the jointing-heading stage, $M_3$ is a third principal component of the jointing-heading stage, $N_1$ is a first principal component of the heading-filling stage, $N_2$ is a second principal component of the heading-filling stage, $N_3$ is a third principal component of the heading-filling stage, $L_1$ is a first principal component of the filling-maturity stage, $L_2$ is a second principal component of the filling-maturity stage, and $L_3$ is a third main component of the filling-maturity stage;

the first principal component $M_1$ of the jointing-heading stage, the second principal component $M_2$ of the jointing-heading stage, and the third principal component $M_3$ of the jointing-heading stage are calculated as follows:

$M_1 = 0.3489X_1 - 0.3489X_2 + 0.3542X_3 + 0.029X_4 - 0.3516X_5 + 0.3563X_6 + 0.3573X_7 + 0.3546X_8 + 0.3551X_9$, $M_2 = -0.0182X_1 + 0.0182X_2 + 0.0020X_3 + 0.9962X_4 + 0.0717X_5 - 0.0120X_6 + 0.0373X_7 - 0.0191X_8 + 0.0178X_9$, $M_3 = -0.5675X_1 + 0.5675X_2 + 0.0519X_3 + 0.0152X_4 - 0.4140X_5 + 0.1459X_6 - 0.0337X_7 + 0.3484X_8 + 0.1921X_9$, wherein, $X_1$ is first-order differential of logarithm, $X_2$ is first-order differential of logarithm of reciprocal, $X_3$ is Rg/Rr, $X_4$ is first-order differential, $X_5$ is first-order differential of reciprocal, $X_6$ is division by $R_{450-750}$, $X_7$ is (Rg−Rr)/(Rg+Rr), $X_8$ is reciprocal, and $X_9$ is logarithm of reciprocal;

the first principal component $N_1$ of the heading-filling stage, the second principal component $N_2$ of the heading-filling stage, and the third principal component $N_3$ of the heading-filling stage are calculated as follows:

$N_1 = 0.3113Q_1 - 0.2973Q_2 - 0.3011Q_3 + 0.3626Q_4 + 0.3441Q_5 - 0.3544Q_6 - 0.3531Q_7 + 0.3531Q_8 + 0.3149Q_9$, $N_2 = -0.1811Q_1 + 0.5257Q_2 + 0.5275Q_3 + 0.0676Q_4 + 0.1590Q_5 - 0.3216Q_6 - 0.3441Q_7 + 0.3441Q_8 - 0.2053Q_9$, $N_3 = 0.6511Q_1 + 0.3235Q_2 + 0.2660Q_3 - 0.2341Q_4 - 0.2332Q_5 + 0.0289Q_6 + 0.0289Q_7 - 0.0289Q_8 + 0.5379Q_9$, wherein, $Q_1$ is division by $R_{930}$, $Q_2$ is SDr/SDy, $Q_3$ is (SDr−SDy)/(SDr+SDy), $Q_4$ is yellow edge area SDy, $Q_5$ is first-order differential, $Q_6$ is reciprocal, $Q_7$ is logarithm of reciprocal, $Q_8$ is logarithm, and $Q_9$ is first-order differential of reciprocal;

the first principal component $L_1$ of the filling-maturity stage, the second principal component $L_2$ of the filling-maturity stage, and the third main component $L_3$ of the filling-maturity stage are calculated as follows:

$L_1 = -0.3301Z_1 - 0.3311Z_2 + 0.3417Z_3 - 0.3392Z_4 + 0.3392Z_5 - 0.3351Z_6 + 0.3197Z_7 + 0.3202Z_8 + 0.3428Z_9$, $L_2 = 0.4065Z_1 + 0.3971Z_2 - 0.2538Z_3 + 0.1021Z_4 - 0.1021Z_5 - 0.0844Z_6 + 0.5348Z_7 + 0.5232Z_8 + 0.1602Z_9$, $L_3 = -0.3082Z_1 - 0.2994Z_2 + 0.1956Z_3 + 0.5979Z_4 - 0.5979Z_5 + 0.0073Z_6 + 0.1196Z_7 + 0.1624Z_8 + 0.1461Z_9$, wherein, $Z_1$ is (Rg−Rr)/(Rg+Rr), $Z_2$ is Rg/Rr, $Z_3$ is division by $R_{450-750}$, $Z_4$ is first-order differential of logarithm, $Z_5$ is first-order differential of logarithm of reciprocal, $Z_6$ is (SDr−SDb)/(SDr+SDb), $Z_7$ is the original reflectance, $Z_8$ is red valley amplitude Rr, and $Z_9$ is division by $R_{930}$.

2. The method for establishing the monitoring model of the water content of the winter wheat canopy based on the spectral parameters according to claim 1, wherein, a method of measuring the spectral reflectance in step S1 is:

adopting a white board with a reflectance of 1 to calibrate before each monitoring, monitoring a winter wheat canopy of 15 cm by a probe of a hand-held ground-object spectrometer arranged vertically downwardly, selecting three monitoring points, and using the hand-held ground-object spectrometer to monitor a spectrum of the three monitoring points of the winter wheat canopy to obtain three monitoring results, and taking an average value of the three monitoring results as the spectral reflectance of the winter wheat canopy.

3. The method for establishing the monitoring model of the water content of the winter wheat canopy based on the spectral parameters according to claim 2, wherein, a method of measuring the water content in step S1 is:

sampling a winter wheat plant after measuring the spectrum, weighing a fresh weight of the winter wheat plant, placing the winter wheat plant into an oven to inactivate the winter wheat plant at 105° C. for 30 min, adjusting a temperature of the oven to 75° C., drying the winter wheat plant to a constant weight, weighing a dry weight of the winter wheat plant, and calculating the water content of the winter wheat plant; wherein a formula for calculating the water content of the winter wheat plant is as follows:

$$\omega = (M_1 - M_2)/M_1,$$

wherein, $\omega$ is the water content, $M_1$ is the fresh weight, and $M_2$ is the dry weight.

\* \* \* \* \*